United States Patent
Davis et al.

(10) Patent No.: US 7,322,031 B2
(45) Date of Patent: Jan. 22, 2008

(54) REMOTE WEB SERVICE CLONING AND INSTANTIATION

(75) Inventors: Douglas B. Davis, Raleigh, NC (US);
Brad B. Topol, Raleigh, NC (US);
Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 10/265,756

(22) Filed: Oct. 7, 2002

(65) Prior Publication Data

US 2004/0068731 A1    Apr. 8, 2004

(51) Int. Cl.
*G06F 9/44* (2006.01)
*G06F 9/445* (2006.01)
*G06F 15/06* (2006.01)
*G06F 15/167* (2006.01)

(52) U.S. Cl. ............... 717/177; 717/172; 709/216; 709/219; 709/242; 709/246

(58) Field of Classification Search ......... 709/217–248
See application file for complete search history.

(56) References Cited

U.S. PATENT DOCUMENTS

| | | | | |
|---|---|---|---|---|
| 6,298,381 | B1 * | 10/2001 | Shah et al. | 709/228 |
| 6,449,657 | B2 * | 9/2002 | Stanbach et al. | 709/245 |
| 6,816,905 | B1 * | 11/2004 | Sheets et al. | 709/226 |
| 2003/0154279 | A1 * | 8/2003 | Aziz | |
| 2003/0233602 | A1 * | 12/2003 | Lindquist et al. | |
| 2004/0064548 | A1 * | 4/2004 | Adams et al. | |
| 2004/0068553 | A1 * | 4/2004 | Davis et al. | |

OTHER PUBLICATIONS

*Axis User's Guide—Beta 2 Version*, <http://docs.pushtotest.com/axisdocs/user-guide.html>, (Aug. 9, 2002).
*Borland Enterprise Server Web Services Preview*, <http://info.borland.com/techpubs/bes/ws_partition.htm>, (Aug. 9, 2002).
*Creating Web Services With Apache Axis*, O'Reilly ONJava.com, <http://www.onjava.com/pub/a/onjava/2002/06/05/axis.html?page=2>, (May 22, 2002).

\* cited by examiner

*Primary Examiner*—Chuck Kendall
(74) *Attorney, Agent, or Firm*—Jeanine Ray-Yarletts, Esq.; Steven M. Greenberg, Esq.; Carey Rodriguez Greenberg & Paul LLP

(57) ABSTRACT

The present invention is a method for cloning an instantiating a Web service from a calling process to a target host. The method can include expanding an application archive to a Web application container in the target host. The archive can include at least one operational file for implementing the Web service, an implementation document for the Web service, and a deployment descriptor for the Web service. A unique identifier can be generated for the Web service. Subsequently, the implementation document can be modified to reference the target host, the Web application in the target host, and the generated unique identifier in specifying the Web service. Also, the deployment descriptor can be modified to reference the generated unique identifier in specifying the Web service. Finally, the Web service can be deployed in the target host using the deployment descriptor; and, a network address referencing the implementation document can be forwarded to the calling process.

9 Claims, 2 Drawing Sheets

REMOTE WEB SERVICE CLONING AND INSTANTIATION

BACKGROUND OF THE INVENTION

1. Statement of the Technical Field

The present invention relates to the field of Web services, and more particularly to the cloning and instantiation of Web service instances.

2. Description of the Related Art

Web services have become the rage of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within computing processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories, and discovery protocols alone on occasion are not suitable for distributed interoperability. Rather, a more structured, formalized mechanism can be necessary to facilitate the distribution of Web services in the formation of a unified application.

Notably, the physiology of a grid mechanism through the Open Grid Services Architecture (OGSA) can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

In a grid architecture, a factory service can be provided which can be tasked with the responsibility for creating and deploying new instances of Web applications. Typically, a Web application in the context of Web services technology can include a collection of servlets, server pages, markup language documents, and supporting elements such as images. The collection can be packaged in an archive so that the Web application can be portably deployed to any servlet-enabled Web server. In a conventional Web application archive, the Web application can be packaged as follows:
index.html
example.jsp
images/on.gif
images/off.gif
WEB-INF/web.xml
WEB-INF/lib/example.jar
WEB-INF/classes/MyServlet.class
WEB-INF/classes/com/servlet/MyWebServlet.class
etc.

Once packaged, the archive can be deployed to an application server.

Notably, in a conventional implementation, the "WEB-INF" directory can be considered to be 'special' as anything stored under the WEB-INF directory is not to be served directly to clients. Rather, the WEB-INF directory typically contains class files used by servlets, for instance, and configuration information used by the Web application itself. In that regard, the web.xml file residing in the WEB-INF directory often is referred to as the 'deployment descriptor'. The deployment descriptor can contain detailed information about the Web application such as URL mappings, servlet registration details, welcome files, MIME types, page-level security constraints and the like.

While cloning a Web application in a static, local manner is a well-understood process, cloning a Web application in a dynamic, remote manner is not so well-understood. Yet, remotely cloning and instantiating a Web service can be critical process in the grid context for enabling Web service invocation capacity to be dynamically increased during peak utilization periods, such as in the case of a retail shopping application which operates during the peak, holiday shopping season. Moreover, remotely cloning and instantiating a Web service can be critical for leveraging large scale grid computing environments in an autonomic fashion.

The artisan of ordinary skill might presume that remotely deploying and instantiating a Web service might involve little more than compressing the archive file containing the Web application, and transmitting the compressed archive to a target, remote enterprise service. Still, in practice, the remote cloning and instantiation of a Web service can be substantially more complex. Specifically, several deployment issues first must be addressed. More particularly, as it will be recognized by one skilled in the art, any WSDL document that exists for the cloned Web service will not have the correct location bindings for the hosting server. Thus, it will be necessary to generate new WSDLs for each new Web service instance.

Also, while a new WSDL implementation document usually will be required, in some cases an existing WSDL interface document can be re-used. Additionally, when creating a new Web service instance on a remote server, it is possible that concurrently, another factory create operation might clone and instantiate an instance of the same Web application to the same remote host. As both cloning operations will involve identical copies of the deployment descriptor, it is important to ensure that two separate Web service instances are deployed notwithstanding the presence of the identical deployment descriptors.

Notably, in some circumstances, different Web service instances can involve the same Web application and, as a result, the different Web service instances can share common library resources. As it will be understood by one of ordinary skill in the art, sharing common library resources can provide a tremendous benefit with regard to reducing the amount of computing resources—namely memory, ordinarily associated with the instantiation and operation of a Web service instance. Yet, in other circumstances, each Web service instance might require a separate Web application due to special needs, such as a required specific version of a supporting library, for example an XML parser. Finally, in order for remote Web service cloning and instantiation to become a viable technology, security mechanisms must be employed.

SUMMARY OF THE INVENTION

The present invention is a method for cloning and instantiating a Web service. The method can include expanding an application archive, for example a Web application archive or a Java application archive, to a Web application container in either a local or a remote host. The archive can include at least one operational file for implementing the Web service, an implementation document for the Web service, and a deployment descriptor for the Web service. A unique identifier can be generated for the Web service. Subsequently, the implementation document can be modified to reference the host, the Web application in the host, and the generated unique identifier in specifying the Web service. Also, the deployment descriptor can be modified to reference the generated unique identifier in specifying the Web service. Finally, the Web service can be deployed in the host using the deployment descriptor; and, a network address referencing the implementation document can be forwarded to the calling process.

Significantly, by generating a unique identifier and by further modifying the implementation document and deployment descriptor to reference the unique identifier, deployment conflicts between multiple instances of the Web service can be avoided as each instance will have a unique name. Moreover, by modifying the implementation document and deployment descriptor to reference the target host rather than the host from which the archive had originated, correct Web service bindings can be maintained. Finally, by permitting the remote host to expand the archive into a selected Web application container, multiple instantiated Web services can share the same Web application container, and as a result, the instantiated Web services can share library resources.

A system for cloning and instantiating a Web service from a calling process to a target host can include a Web service creation process disposed in a first Web services host; and, a service deployment processor disposed in a second Web services host. The service deployment processor can include logic for expanding an application archive forwarded to the second Web services host by the first Web services host into a selected one of at least one Web application container and associated Web application storage disposed in the second Web services host. The service deployment processor further can have logic for generating a unique identifier for a Web service defined within the Web application archive.

Finally, the service deployment processor can have yet further logic for modifying both an implementation document and a deployment descriptor for the Web service contained in the application archive to reference both the second Web services host and the generated unique identifier. Importantly, each of the first and second Web hosts can be grid hosts, such as those grid hosts defined by the OGSA. Optionally, in respect to security considerations, the system can further include a virtual machine upon which the remote service deployment processor can execute. Finally, the target host can be a remote host which has been remotely positioned from the first Web services host.

A remote host which has been configured in accordance with the inventive arrangements can include a Web server and an application server executing in conjunction with the Web server. A Web services engine can be provided as can an associated Web services creation process configured for operation with the application server. Finally, a remote service deployment processor can be coupled to the application server and configured by the Web services engine. The remote service deployment processor can include logic for expanding an application archive into a selected Web application container and an associated Web application storage hierarchy.

The remote service deployment processor further can include logic for generating a unique identifier for a Web service defined by the application archive and for modifying each of an implementation document and deployment descriptor for the Web service to reference both the unique identifier and the remote host. Finally, the remote service deployment processor can include logic for calling the Web services creation process with a modified one of the deployment descriptor in order to instantiate the Web service. Notably, the remote host can be a grid host and the Web services creation process can be a grid services factory creation process.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for cloning and instantiating an instance of a Web service within a remote host. In accordance with the inventive arrangements, a Web service can be archived within a local host along with an associated deployment descriptor and implementation document. The archive can be forwarded from the local host to a remote host which can expand the archive variably to one of an existing application container or a newly created application container.

The Web service can be assigned a unique identity in the remote host, and in consequence, the Web service implementation document can be modified to reference with specificity, not only the identity of the remote host, but also the unique identity of the Web service in the remote host. Additionally, to the extent a new Web service interface document will be required for use with the Web service, the Web service implementation document can be modified to reference the location of the Web service interface document in the remote host.

Importantly, a deployment descriptor associated with the Web service application can be modified to reflect the unique identity of the Web service. Once the deployment descriptor has been modified, the modified deployment descriptor can be passed to a Web services engine in the remote host so that the Web services engine can deploy the Web service in the remote host. Subsequently, a network reference to the modified Web service implementation document can be returned to the local host so that the local host can publish and utilize the remotely deployed Web service as need be.

Notably, the method, system and apparatus of the present invention can be adapted for use in a Web services grid such as a grid which conforms to the OGSA. Specifically, the local host can be a grid host in which a factory create service can reside. The factory create service can forward the archived Web service to a remotely positioned grid host. The remotely positioned grid host, in turn, can undertake the assignment of a unique identity to the Web service and the modification of the implementation document and the deployment descriptor in accordance with the inventive arrangements.

Figure 1:
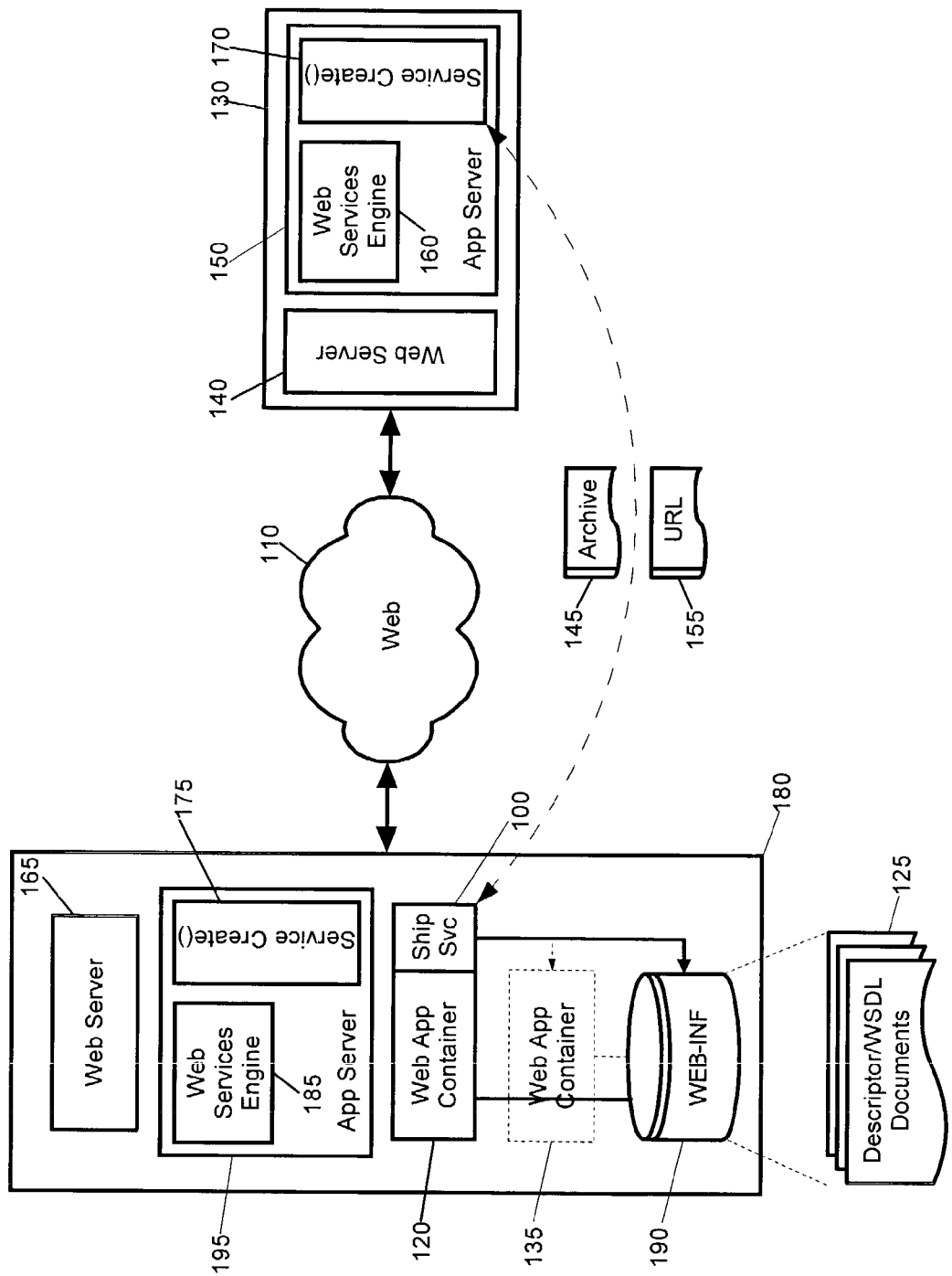
FIG. 1 is a block illustration of a Web services system in which Web services can be cloned and instantiated within a remote host in accordance with the inventive arrangements; and, FIG. 2 is a flow chart illustrating a process for cloning a Web service instance to a remote host in the system of FIG. 1.

FIG. 1 is a block illustration of a Web services system in which Web service applications can be cloned and instantiated within a remote host in accordance with the inventive arrangements. Specifically, each of a local host 130 and a remote host 180 can be communicatively linked over a computer communications network 110 such as the Internet. The local host 130 can include a Web server 140 configured to process Web requests such as those formatted according to the hypertext transfer protocol (HTTP), the file transfer protocol (FTP), or other such operative protocol.

An application server 150 can be disposed in the local host 130 and can operate in conjunction with the Web server 140. In particular, the application server 150 can provide on-demand processing by selected application logic which can be accessed by the application server 130. Application servers are well-known in the art and can include, for instance, the Websphere™ application server manufactured by International Business Machines Corporation of Armonk, N.Y., United States.

A Web services engine 160 can be configured for operation with the application server 150 so that Web services can be published, created and invoked through the Web server 140 and application server 150 as is well-known in the art. In particular, a Web service creation process 170 can provide the logic necessary to clone and instantiate a Web service, both locally as is known in the art, and remotely to another host such as the remote host 180 in accordance with the present invention. The remote host 180 can include at least one web application container 120 in which Web services can be instantiated. Additionally, other Web application containers 135 can be created as need be to accommodate the instantiation of additional Web services which otherwise are not preferred to be instantiated within the Web application container 120.

As in the case of conventional Web application containers, the Web application containers 120, 135 can have an associated storage 190 such as a WEB-INF directory or functionally similar such structure, though the associated storage 190 need not necessarily be a WEB-INF directory. As will be recognized by one skilled in the art, the storage 190 can store in association with a Web application container 120, 135 Web services deployment and operational files, such as the class files required for execution by an associated Web service, a deployment descriptor for the Web service, an implementation document for the Web service, and an interface document for the Web service, collectively referred to herein as the descriptor, WSDL documents 125.

Notably, a remote service deployment processor 100 can be disposed within or in association with the remote host 180. The remote service deployment processor 100 can receive archived Web services from remote service creation processes and can deploy such received Web services locally in the remote host 180 in accordance with the inventive arrangements. Finally, to the extent that the remote host 180 can operate in a similar fashion as the local host 130, the remote host 180, too, can include a Web server 165, an application server 195, a Web services engine 185 and a service creation process 175.

In operation, a request can be received in the Web server 140 and, if the request relates to the creation of a Web service, the request can be forwarded to the Web services engine 160 disposed within or in association with the application server 150. The Web services engine 160, for strategic purposes such as the balancing of load across multiple hosts, can determine that the requested Web service ought to be cloned and instantiated not locally, but in the remote host 180. In consequence, the Web services creation process 170 can archive the requested Web service along with associated descriptor, implementation and interface documents, and can forward the archive 145 over the computer communications network 110 to the remote host 180.

The remote host 180 can receive the archive in the remote service deployment processor 100 which can expand the archive 145 variably to one of an existing, associated Web application container 120, or a newly created Web application container 135. In either case, the archive 145 can be appropriately expanded with both associated operational files such as class files, and associated descriptor/WSDL documents 125 being stored in the associated storage 190. Importantly, the Web service included in the archive 145 can be assigned a unique instance identifier so as to distinguish the Web service instance from other Web service instances in other Web application containers both locally and remotely. Specifically, when included as part of a network address required to access the Web service instance, the concatenation of the original Web service instance name with the UniqueID can help in recognizing the pedigree of the remotely deployed Web service.

As a unique indentifier has been assigned to the Web service, the Web service implementation document can be modified to reflect not only the remote grid host and chosen Web application container, but also the new identifier, as can the deployment descriptor. Furthermore, to the extent that a Web service interface document has been stored in the associated storage 190, the Web service implementation document can be modified to reflect the location of the Web service interface. Finally, the Web service implementation document can be further modified to reflect the network address of the Web service in the remote host 180 rather than the local host 130. Once each of the Web service implementation document, the deployment descriptor, and optionally the Web service interface document has been modified, the deployment descriptor can be provided to the Web services engine 195 which can instantiate the Web service in the remote host 180. Finally, the network address 155 of the Web service implementation document can be returned to the service creation process 170 so that the Web service can be utilized as required by the local host 120.

Importantly, the system illustrated in FIG. 1 can be adapted for use in a grid architecture such as that defined by OGSA and specified, for example, according to the Globus Project, *Globus Toolkit Futures: An Open Grid Services Architecture*, Globus Tutorial, Argonne National Laboratory (Jan. 29, 2002). In that regard, the service creation processes 170, 175 can be factory service creation grid services which can deploy grid services to remotely positioned grid hosts responsive to changing needs in the Web services grid. Hence, on demand, the service creation process 170, acting as a factory service creation process, can forward the archived Web service to the remote host 180, acting as a remote grid host, in the same fashion as described in the foregoing specification.

Figure 2:
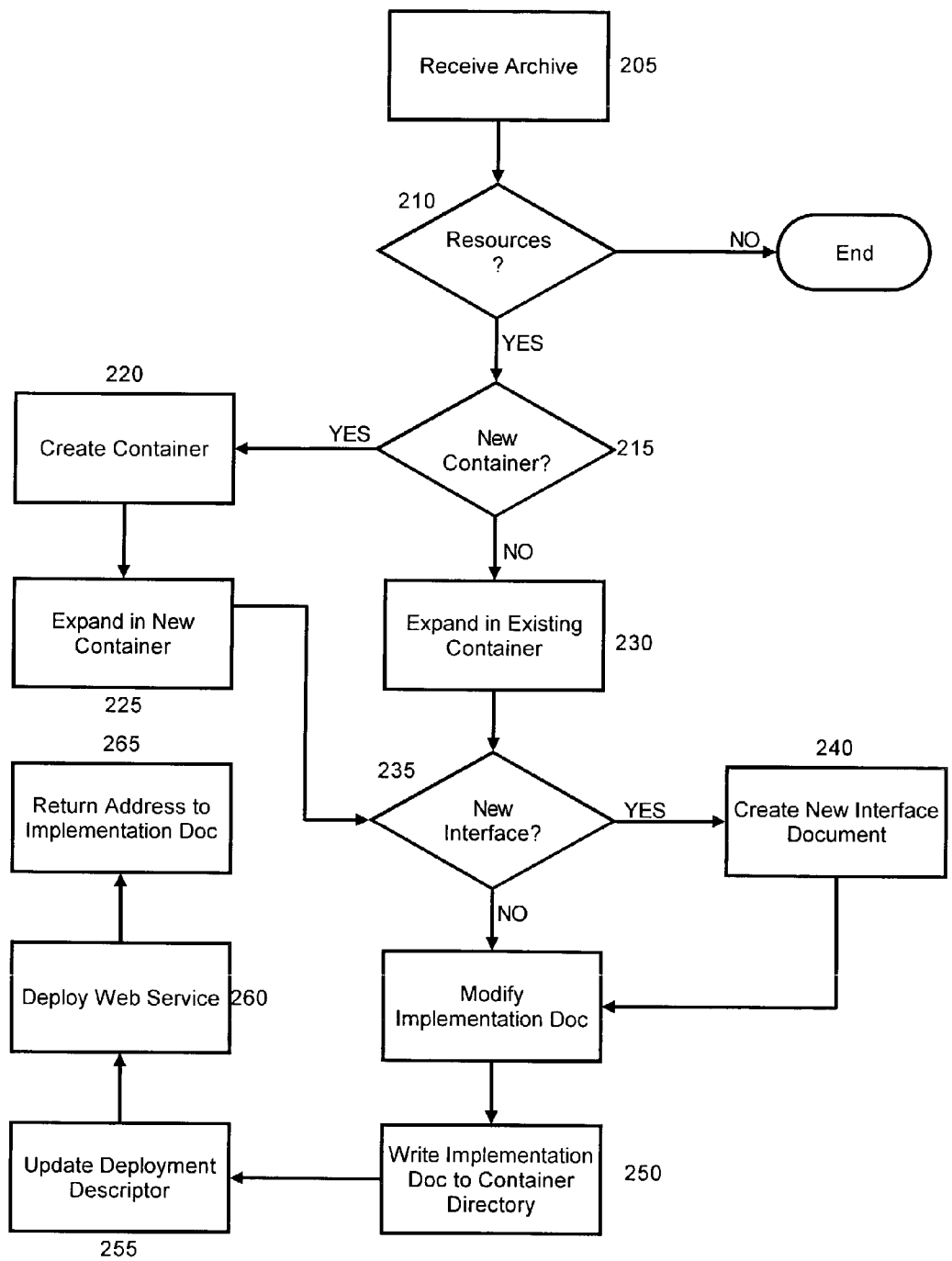

FIG. 2 is a flow chart more particularly illustrating a process for cloning a Web service instance to a remote host in the system of FIG. 1. Beginning in block 205, a remote service deployment processor, hereinafter referred to as "ShipService", can receive an archive containing a Web service intended for remote deployment. In decision block 210, ShipService can determine whether the remote host has available resources to process a new Web service. If not, the process can terminate. Otherwise, in decision block 215, it can be determined whether the Web service contained within the archive will require a new Web application container, or whether the Web service can utilize an existing Web application container.

If, in decision block 215 it is determined that a new Web application will be required, in block 220, a new Web application can be created for the Web service. Once the new Web application container has been created in block 220, in block 225 the archive can be expanded as part of the new Web application container. Alternatively, if in decision block 215 it is determined that an existing Web application can be used, in block 230 the archive can be expanded as part of the existing Web application container. Namely, the operational files within the archive, such as class files or Java archive files, can be copied into storage associated with the Web application, for example WEB-INF/classes and WEB-INF/lib directories.

In decision block 235, once the Web service has been expanded as part of a Web application container, it can be determined whether it will be necessary to create a new interface document for the Web service, or whether the existing interface document for the Web service can suffice. If a new interface document will be required, in block 240 the interface document included with the archive can be written to the WEB-INF directory. In any case, in block 245, a new implementation document can be created from the implementation document included with the archive. For example, where the implementation document has been formatted according to WSDL, the location attribute of the soap:address element can be updated for the Web service.

The location attribute can be updated by combining the original name of the Web service obtained from the deployment descriptor, a unique instance identifier, and a URL prefix appropriate for the Web application container which hosts the new Web service. For instance, where the Web service, MyWebService has been deployed to the remote host MyRemoteHost as part of the Web application container MyWebApp, the location attribute of the soap:address element could be modified to reflect:

http://MyRemoteHost:80/MyWebApp/services/ MyWebService<UniqueID>

While it is not required that the original name of the Web service be concatenated with the UniqueID as any such unique name can suffice, one skilled in the art will recognize that the concatenation of the original Web service name with the UniqueID can help in recognizing the pedigree of the remotely deployed Web service.

In any case, the location attribute of the import element can be modified within the implementation document so as to reflect the interface document, newly created or otherwise. For example, in the WSDL context, if the original import element from the implementation document included as follows:

<wsdl:import location="http://original.server.com:80/MyWebService/MyWebService _Interface.wsdl" namespace= "http://MyWebService-Interface"/>

The location attribute could be modified as follows:

<wsdl:import location="http://remote.server.com:80/MyWebApp/MyWebService_Interface.wsdl" namespace= http://MyWebService-Interface"/>

Once again, though not shown, a unique instance identifier can be included in the modified location attribute to avoid conflicting references to multiple Web service interface documents disposed about the network.

In block 250, once the implementation document has been modified, the implementation document can be written to the container directory—namely the WEB-INF directory in a preferred aspect of the invention. Subsequently, in block 255, the deployment descriptor for the Web service can be modified to reflect the unique identifier. For example, where the original deployment descriptor included the following,

```
<deployment
xmlns="http://xml.apache.org/axis/wsdd/"
xmlns:java="http://xml.apache.org/axis/wsdd/providers/java">
    <service name="MyWebService" provider="java:RPC">
        <parameter name="className" value="MyWebService"/>
        <parameter name="methodName" value="*"/>
    </service>
</deployment>
``` the name attribute of the service element can be updated to include a suitable reference to the unique indentifier as follows:

```
<deployment
xmlns="http://xml.apache.org/axis/wsdd/"
xmlns:java="http://xml.apache.org/axis/wsdd/providers/java">
    <service name="MyWebService+<uniqueID>"
    provider="java:RPC">
        <parameter name="className" value="MyWebService"/>
        <parameter name="methodName" value="*"/>
    </service>
</deployment>
```

Subsequently, in block 260 the Web service can be deployed in the remote host. For instance, where the Web services engine is the Apache™ Axis™ Web Services Engine, a new instance of the Axis Admin class can be created and the process( ) method can be called. More particularly, the newly modified deployment descriptor can be provided as a parameter to the function call. Having deployed the Web service using the modified deployment descriptor, in block 265 the URL of the implementation document can be returned to the remote calling process. Once the remote calling process has received the new implementation document for the remotely instantiated Web service instance, the calling process can publish and utilize the implementation document as required.

Importantly, as one of ordinary skill will recognize, the process of cloning and instantiating remote Web service instances as described herein can implicate some security considerations. To mitigate security risks associated with the method of the invention, the invocation of a remote service deployment processor can be restricted to particular users, network devices, processes or user groups. Alternatively, the application server disposed in the remote host can operate on top of a virtual machine configured to intercept system calls to access host computing resources and to permit access only where specified according to security rules.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for cloning and instantiating a Web service from a calling process to a target host comprising the steps of:
   expanding an application archive to a Web application container in the target host, said archive comprising at least one operational file for implementing the Web service, an implementation document for the Web service, and a deployment descriptor for the Web service;
   generating a unique identifier for the Web service;
   first modifying said implementation document to reference the target host, the Web application in the target host, and said generated unique identifier in specifying the Web service;
   second modifying said deployment descriptor to reference said generated unique identifier in specifying the Web service;
   deploying the Web service in the target host using said deployment descriptor; and,
   forwarding a network address referencing the implementation document to the calling process.

2. The method of claim 1, wherein said first modifying step further comprises the step of, if a new interface document has been created in the target host, modifying said implementation document to reference said new interface document in the target host.

3. A system for cloning and instantiating a Web service from a calling process to a remote host comprising:
   a Web service creation process disposed in a first Web services host; and,
   a remote service deployment processor disposed in a second Web services host, said second Web services host having a remote orientation relative to said first Web services host;
   said remote service deployment processor having logic for expanding an application archive forwarded to said second Web services host by said first Web services host into a selected one of at least one Web application container and associated Web application storage disposed in said second Web services host,
   said remote service deployment processor having further logic for generating a unique indentifier for a Web service defined within said application archive, and
   said remote service deployment processor having yet further logic for modifying both an implementation document and a deployment descriptor for said Web service contained in said application archive to reference both said second Web services host and said generated unique identifier.

4. The system of claim 3, wherein each of said first and second Web hosts are grid hosts.

5. The system of claim 3, further comprising a virtual machine upon which said remote service deployment processor can execute.

6. A remote host apparatus comprising:
   a Web server and an application server executing in conjunction with said Web server;
   a Web services engine and an associated Web services creation process configured for operation with said application server; and,
   a remote service deployment processor coupled to said application server and configured by said Web services engine,
   said remote service deployment processor comprising logic for expanding an application archive into a selected Web application container and an associated Web application storage hierarchy, said remote service deployment processor further comprising logic for generating a unique identifier for a Web service defined by said application archive and for modifying each of an implementation document and deployment descriptor for said Web service to reference both said unique identifier and the remote host, said remote service deployment processor further comprising logic for calling said Web services creation process with a modified one of said deployment descriptor in order to instantiate said Web service.

7. The apparatus of claim 6, wherein the remote host is a grid host and wherein said Web services creation process is a grid services factory creation process.

8. A machine readable storage having stored thereon a computer program for cloning and instantiating a Web service from a calling process to a target host, the computer program comprising a routine set of instructions which when executed cause the machine to perform the steps of:

expanding an application archive to a Web application container in the target host, said archive comprising at least one operational file for implementing the Web service, an implementation document for the Web service, and a deployment descriptor for the Web service;

generating a unique identifier for the Web service;

first modifying said implementation document to reference the target host, the Web application in the target host, and said generated unique identifier in specifying the Web service;

second modifying said deployment descriptor to reference said generated unique identifier in specifying the Web service;

deploying the Web service in the target host using said deployment descriptor; and, forwarding a network address referencing the implementation document to the calling process.

9. The machine readable storage of claim 8, wherein said first modifying step further comprises the step of, if a new interface document has been created in the target host, modifying said implementation document to reference said new interface document in the remote host.

* * * * *